United States Patent
Okamoto et al.

[11] Patent Number: 5,271,486
[45] Date of Patent: Dec. 21, 1993

[54] TORQUE LIMITER

[75] Inventors: Yuji Okamoto; Masahiko Kataoka; Kenichi Ichikawa; Shoji Itomi, all of Kuwana, Japan

[73] Assignee: NTN Corporation, Osaka, Japan

[21] Appl. No.: 702,116

[22] Filed: May 16, 1991

Related U.S. Application Data

[63] Continuation of Ser. No. 489,587, Mar. 7, 1990, abandoned.

[30] Foreign Application Priority Data

Mar. 13, 1989 [JP] Japan ................. 1-61430

[51] Int. Cl.⁵ .................... F16D 7/06; F16D 41/06
[52] U.S. Cl. ........................... 192/45; 464/30
[58] Field of Search ............. 192/45, 41 R; 464/30

[56] References Cited

U.S. PATENT DOCUMENTS

| | | | |
|---|---|---|---|
| 2,211,053 | 8/1940 | Critchfield | 192/45 |
| 2,843,238 | 7/1958 | Rozner | 192/45 |
| 2,902,125 | 9/1959 | House et al. | 192/45 |
| 3,014,567 | 12/1961 | Stockton | 192/45 |
| 3,031,052 | 4/1962 | Blinder | 192/45 |
| 3,087,589 | 4/1963 | Gorsky | 192/45 |
| 3,993,176 | 11/1976 | Marola et al. | 192/45 |
| 4,178,805 | 12/1979 | Mazzorana | 192/45 |
| 4,236,619 | 12/1980 | Kuroda | 192/45 |
| 4,828,086 | 5/1989 | Lederman | 192/41 RX |
| 4,852,708 | 8/1989 | Parkhurst | 192/45 |

FOREIGN PATENT DOCUMENTS 1-158827 11/1989 Japan.

*Primary Examiner*—Richard M. Lorence
*Attorney, Agent, or Firm*—Armstrong, Westerman, Hattori, McLeland & Naughton

[57] ABSTRACT

A torque limiter having an outer ring with a plurality of cam surfaces and spring supporting surfaces formed on an inner peripheral surface, an inner member mounted in the outer ring, and a plurality of rollers mounted between the cam surfaces and the inner member. Springs supported on the spring supporting surfaces bias the rollers in a direction to bite into the cam surfaces and the inner member. The springs have a predetermined spring force which is sufficient to maintain the rollers in wedging engagement between the cam surfaces and the inner member when a turning torque for turning the inner member in a direction to urge the rollers out of the wedging engagement is applied to the inner member, but only until the applied torque reaches a predetermined value.

1 Claim, 3 Drawing Sheets

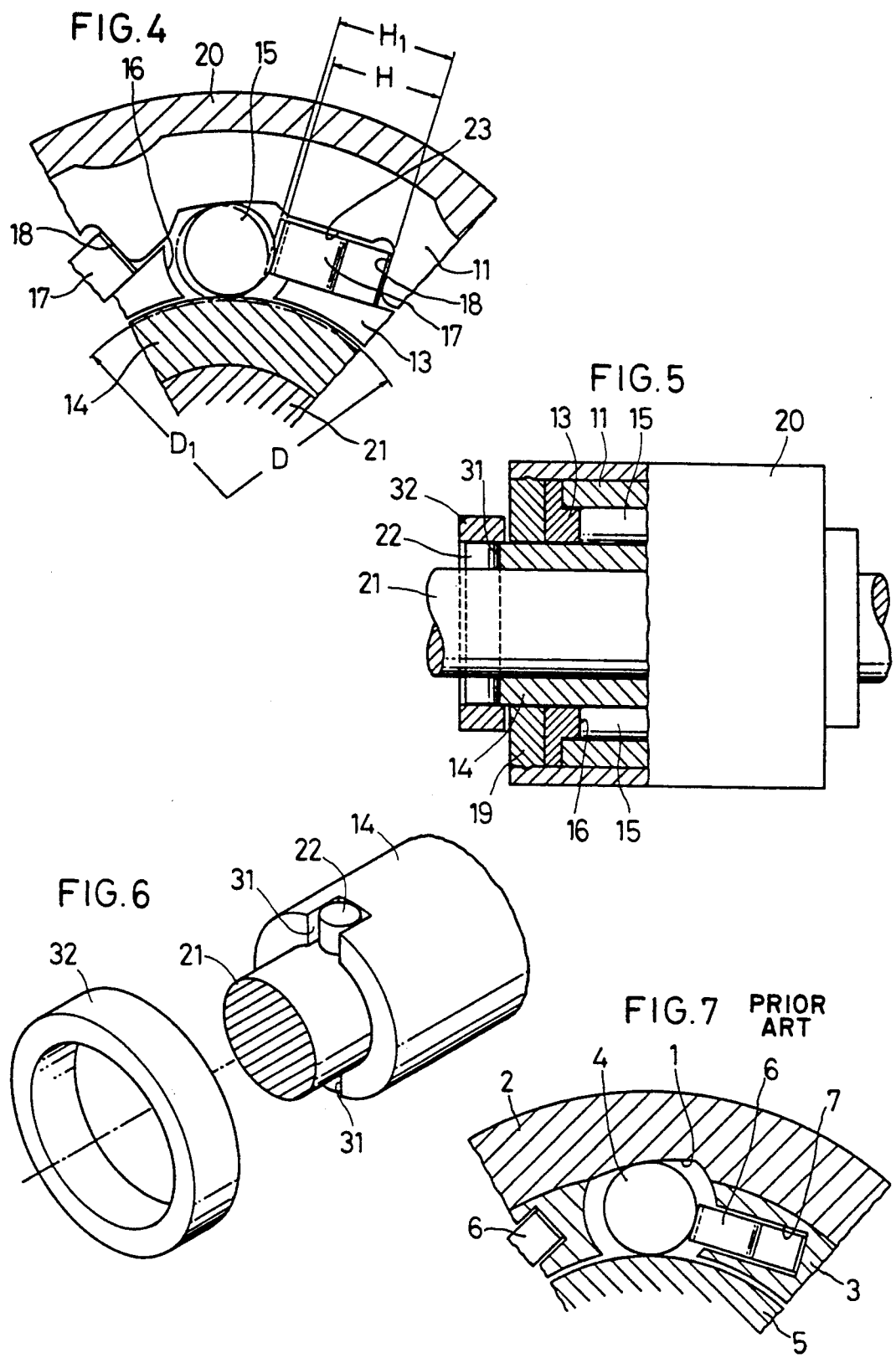

TORQUE LIMITER

This application is a continuation of application Ser. No. 489,587, filed on Mar. 7, 1990, now abandoned.

The present invention relates to a torque limiter for selectively transmitting torque and cutting off torque transmission, and more particularly a torque limiter which can be used as a mechanism for preventing sheets of paper from being fed with one sheet overlapping another, provided in a paper feed roller unit or as a tension brake in a mechanism for feeding a tape, ribbon or sheet.

Among the prior art torque limiters, a powder torque limiter and a spring clutch type torque limiter are well-known. While the former has a high performance, it is structurally complicated and thus costly. Also, it is difficult to handle because it is integral with a shaft. The latter has a problem that its on-off torque tends to fluctuate and its service life is short.

In order to solve the problems with such prior art torque limiters, the present inventors proposed in the Japanese Utility Model Application 63-55348 an improved torque limiter which utilizes the basic structure of a one-way clutch and which can be manufactured at low cost.

As shown in FIG. 7, torque limiter of Japanese Utility Model Application 63-55348 comprises an outer ring 2 formed on its inner peripheral surface with a plurality of clutch cam surfaces 1, a cage 3 of synthetic resin mounted in the outer ring 2, rollers 4 held in spaces defined by the cage 3 and the cam surfaces 1, and S-shaped springs 6 fitted in recesses 7 formed in the cage 3 to bias the respective rollers 4 in such a direction as to cause them to bite into between the clutch cam surfaces 1 and a shaft 5 extending through the cage 3. The clutch cam surfaces 1, on which the biasing force of the springs 6 and the roller 4 act, have such a wedge angle that an on-off torque is produced as the shaft 5 rotates.

One problem in supporting the S-shaped springs 6 by the cage 3 made of synthetic resin is that if the biasing force of the springs 6 is large, it can deform the cage 3, thus causing the on-off torque to fluctuate.

It is an object of the present invention to provide a torque limiter which obviates the abovesaid shortcomings, in which the distance between the respective rollers and the spring supporting surfaces is kept unchanged, and which is capable of preventing the fluctuation of on-off torque.

In accordance with the present invention, there is provided a torque limiter comprising an outer ring formed on the inner peripheral surface thereof with a plurality of clutch cam surfaces and spring supporting surfaces, an inner member mounted in the outer ring, a plurality of rollers mounted between the respective clutch cam surfaces and the inner member, and springs supported on the spring supporting surfaces to bias the rollers in such a direction as to bite into between the clutch cam surfaces and the inner member.

The rollers are mounted between the clutch cam surfaces on the outer ring and the outer peripheral surface of the inner member. The springs for biasing the rollers in such a direction as to bite into between the clutch cam surfaces and the inner member are supported on the supporting surfaces formed on the inner peripheral surface of the outer ring. This makes it possible to keep constant the distance between the respective rollers and the spring supporting surfaces and to prevent the fluctuation of deflection of the springs and thus the fluctuation of on-off torque.

By the provision of the inner ring as an inner member, different on-off torque values can be attained with a smaller number of parts by combining springs with rollers and inner rings of different sizes.

Other features and objects of the present invention will become apparent from the following description taken with reference to the accompanying drawings, in which:

FIG. 4 is a view showing how the value of the required on-off torque is set;

FIG. 5 is a vertical sectional side view showing the structure for preventing the pin coupling the inner ring and the shaft together from coming out;

FIG. 6 is an exploded perspective view of the same; and

Figure 1:
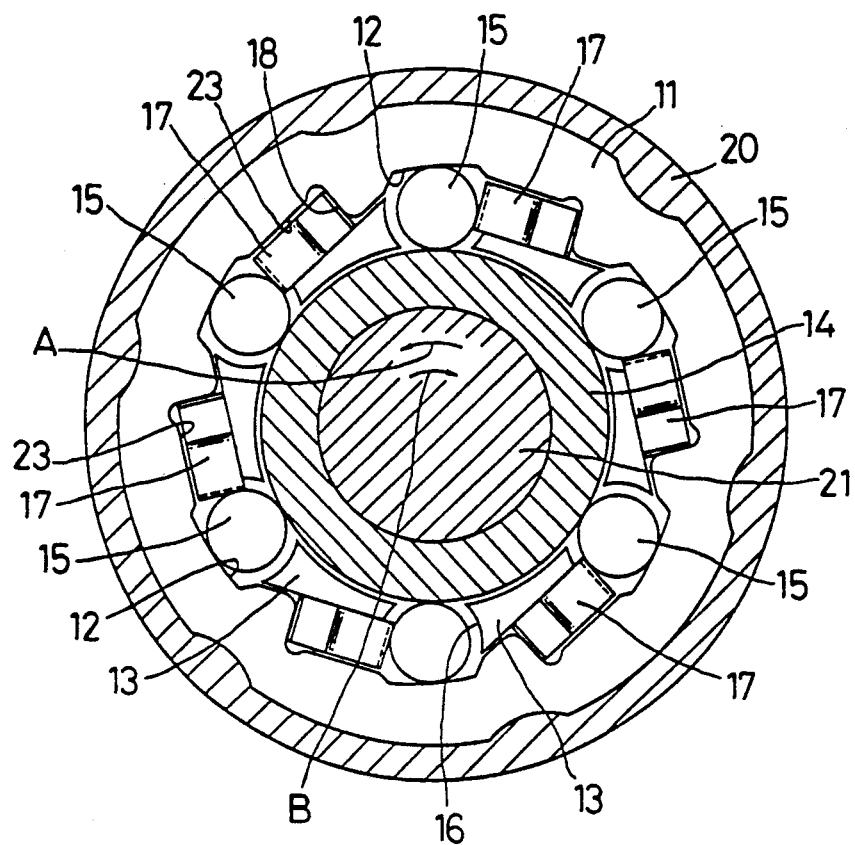
FIG. 1 is a vertical sectional front view of the torque limiter embodying the present invention.

FIG. 7 is a vertical sectional front view of a torque limiter according to Japanese U. M. Application 63-55348.

Now referring to the drawings, the torque limiter according to the present invention has basically the same construction as a one-way clutch. It comprises an outer ring 11 formed on its inner peripheral surface with a plurality of clutch cam surfaces 12, a cage 13 mounted in the outer ring 11 and formed with a plurality of pockets 16, an inner ring 14 mounted in the cage 13, a plurality of rollers 15 disposed between the clutch cam surfaces 12 on the outer ring 11 and the outer peripheral surface of the inner ring and received in the respective pockets 16 formed in the cage 13, and springs 17 supported on supporting surfaces 18 formed on the inner peripheral surface of the outer ring 11 to bias the rollers 15 in such a direction as to bite into between the clutch cam surfaces 12 and the inner ring 14.

The outer ring 11 has one end thereof closed by a lid 19 fitted on the outer periphery of the inner ring 14. An outer member 20 made of synthetic resin is put on the outer ring 11 to cover the outer peripheral surface and the other end thereof as well as the outer periphery of the lid 19. The inner ring 14 is coupled by a pin 22 to a shaft 21 extending therethrough so as to turn with the shaft.

In the embodiment shown, the inner member comprises the shaft 21 and the inner ring 14 mounted thereon. But the inner ring 14 may be omitted while leaving only the shaft 21 to set the rollers 15 or the like between the outer ring 11 and the shaft 21.

If the shaft 21 rotates in the direction of arrow A in FIG. 1, its rotation is transmitted to the outer ring 11 through the rollers 15. If the shaft 21 rotates in the reverse direction, that is, the direction of arrow B, its rotation will not be transmitted to the outer ring 11; in other words, it will idle. Thus the torque limiter has the function of a one-way clutch.

By adjusting the wedge angle of the clutch cam surfaces 12 and the biasing force of the springs 17, the on-off torque with respect to the rotation of the shaft 21 in the direction of arrow B, i.e. the torque at which the shaft 21 begins to idle, can be set. Thus the torque limiter according to the present invention can be used as a one-way torque limiter having means for preventing backspin.

The metallic outer ring 11 is formed on its inner peripheral surface with recessed portions 23 for receiving the springs 17 so as to be integral with the clutch cam surfaces 12. Their respective end walls serve as the supporting surfaces 18 for supporting the springs 17. With this arrangement, the distance between the respective rollers 15 and the supporting surfaces for the springs 17 can be held constant. This will in turn serve to keep constant the biasing force of the springs 17 and thus to prevent the fluctuation of the on-off torque.

Figure 2:
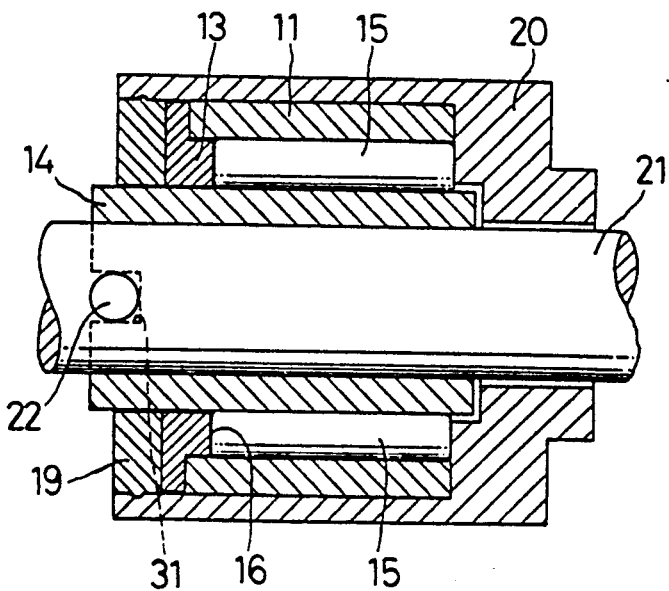
FIG. 2 is a vertical sectional side view of the same.
Figure 3:
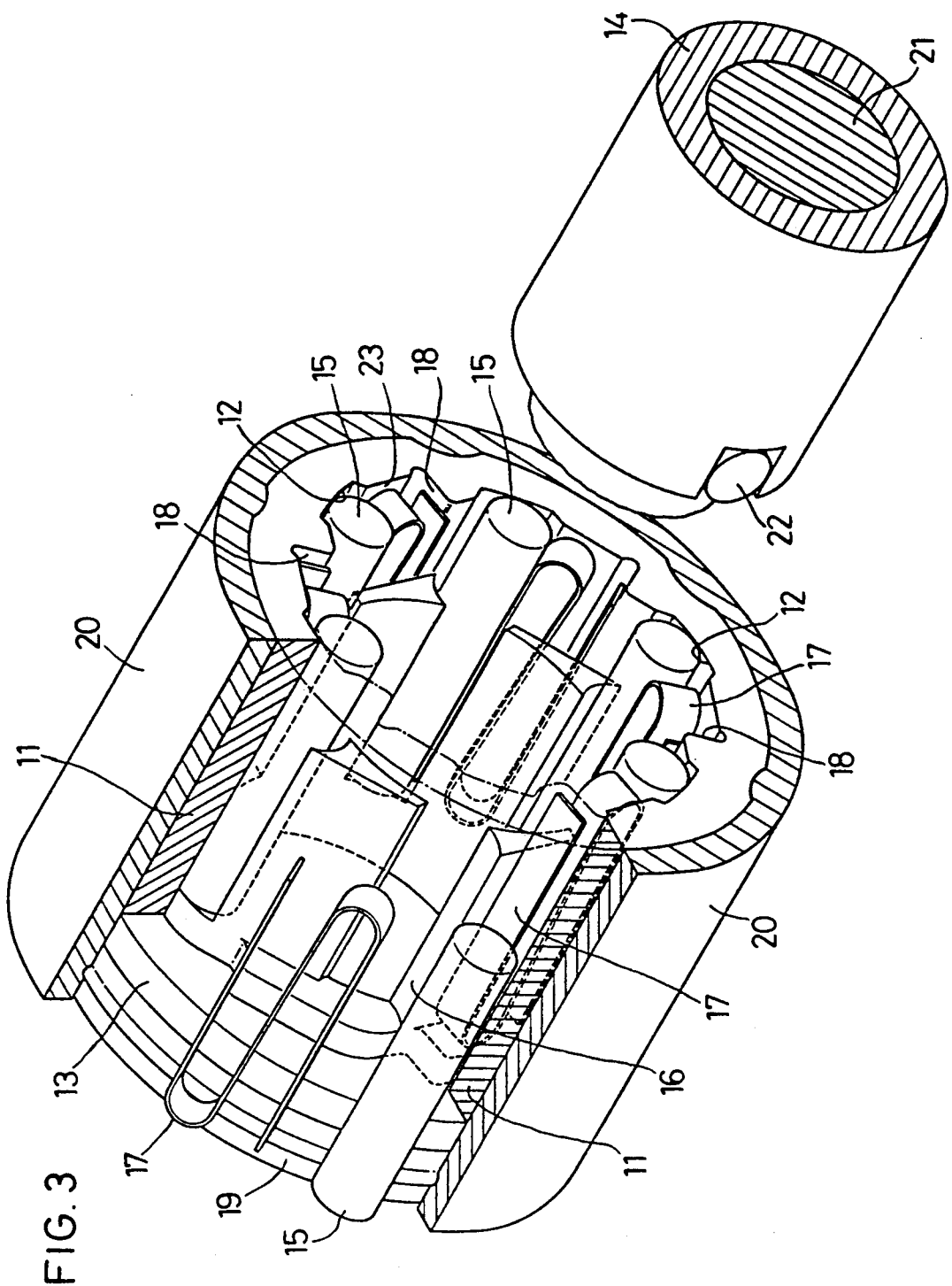
FIG. 3 is an exploded perspective view of a portion of the same.

By the provision of the inner ring 14 in the outer ring 11, the lid 19 and the outer member 20 can be mounted thereon as shown in FIG. 2, to form a torque limiter of a sealed type. This makes it possible to prevent the leakage of grease and the admission of dust and thus to stabilize the on-off torque for a prolonged period of time.

In order to minimize the fluctuation of on-off torque, it is important that the surface of the member in contact with the rollers 15 have a required roughness. By the provision of the inner ring 14, the surface roughness of the outer peripheral surface of the inner ring can be controlled.

As shown in FIG. 2, the inner ring 14 and the shaft 21 are coupled together so as not to be rotatable relative to each other by engaging a pin 22 extending diametrically through the shaft 21 in cutouts 31 formed in the inner ring 14 at one end thereof at diametrically opposite positions.

In the example shown in FIGS. 5 and 6, a ring 32 is fitted on the outer periphery of the inner ring 14 at the end thereof to prevent the pin 22 from coming out.

This ring 32 is made of synthetic resin and is press-fitted on the inner ring 14 or bonded thereto to prevent the pin 22 from coming out.

The value of the on-off torque is determined by the biasing force of the springs 17, the diameter of the rollers 15 and the outer diameter of the inner ring 14 if the dimensions of the outer ring 11 are unchanged. The on-off torque values required by users differ from one user to another. If the parts are designed for every required on-off torque, a large number of parts will have to be stocked.

In contrast, by preparing several kinds of springs 17 having different biasing forces as well as rollers 15 and inner rings 14 having slightly different dimensions from one another, various on-off torque values can be attained with a smaller number of parts. The provision of the inner ring 14 serves to expand the range of attainable torque values and makes possible more delicate torque control.

FIG. 4 shows by way of example how to set torque. The solid line illustrate an inner ring 14 having an outer diameter D. The springs 17 used are ones which give an on-off torque of 300 gf.cm if their height is H.

In order to meet the request for an on-off torque of 280 gf.cm, it is necessary only to reduce their biasing force.

For this purpose, the inner ring 14 has to be replaced with one having such an outer diameter D1 that the height of the springs will be H1.

Instead of changing the outer diameter of the inner ring 14 as shown in FIG. 4, the adjustment of torque may be made by changing the diameter of the rollers 15.

Even if it turns out in the final checkup that the torque value is off specification, it can be corrected so as to be within specification by replacing the inner ring with another one having a different outer diameter.

What is claimed is:

1. A torque limiter comprising an outer ring having a plurality of cam surfaces formed on an inner peripheral surface thereof, an inner member mounted in said outer ring, a plurality of rollers mounted between said respective cam surfaces and said inner member, and springs for urging said rollers in a direction to provide engagement between said outer ring and said inner member, said springs having a predetermined spring force which is sufficient to maintain said rollers in engagement between said cam surfaces and said inner member when a turning torque for turning said inner member in a direction to urge said rollers out of said engagement is applied to said inner member until the applied torque reaches a predetermined value;

a cage mounted in said outer ring and formed with a plurality of pocket to receive said rollers;

said cage providing spring guide surfaces for guiding a radial inner side of said springs;

said outer ring having spring guide surfaces for guiding a radial outer side of said springs and spring supporting surfaces for supporting ends of said springs opposite to the ends of said springs near said rollers; and said springs being supported in position by said spring supporting surfaces of said outer member.

* * * * *